April 6, 1954

T. B. DALTON 2,674,438

SUPPORT FOR SEMITRAILERS

Filed May 7, 1952

INVENTOR.
THOMAS B. DALTON
BY
ATTORNEYS.

April 6, 1954

T. B. DALTON 2,674,438

SUPPORT FOR SEMITRAILERS

Filed May 7, 1952

INVENTOR.
THOMAS B. DALTON
BY
Barnes, Kisseller, Laughlin & Raich
ATTORNEYS.

April 6, 1954   T. B. DALTON   2,674,438
SUPPORT FOR SEMITRAILERS
Filed May 7, 1952   3 Sheets-Sheet 3

INVENTOR.
THOMAS B. DALTON
BY
*Barnes, Kisselle, Laughlin & Raisch*
ATTORNEYS.

Patented Apr. 6, 1954

2,674,438

UNITED STATES PATENT OFFICE 2,674,438

SUPPORT FOR SEMITRAILERS

Thomas B. Dalton, Muskegon, Mich., assignor to West Michigan Steel Foundry Co., Muskegon, Mich., a corporation of Michigan Application May 7, 1952, Serial No. 286,541

10 Claims. (Cl. 254—86)

This invention relates to a support structure for semi-trailers. It is well understood that a semi-trailer is a road vehicle having ground engaging wheels at its rear end, and its forward end is arranged to be supported upon a tractor. When the semi-trailer is detached from the tractor, it is held by means of a supporting structure, sometimes called landing gear, and sometimes called supporting legs.

The invention is concerned with an improved support structure which embodies a supporting strut or leg adjacent each side of the semi-trailer frame or body. One object of the invention is to provide an improved construction having a fast action so that it may be raised and lowered rapidly when not under load and yet one which provides for an adequate high torque ratio for operation thereof when under load. In this connection, the supporting leg structures have ground engaging parts interconnected with an operating device so that a plurality of speed and torque ratios may be effected. The invention may be embodied in a structure which has two speed and two torque ratios, it being understood that speed and torque are reciprocal.

Another object of the invention is to provide an improved supporting structure which has substantially an automatic leveling characteristic. This is accomplished incident to the load which may be placed upon one or the other of the legs of the support. The two supporting legs are constructed to be raised and lowered and are operated from a common operating element, and when one is under load and the other is not under load, the one under load is moved by the operating means at a lower speed ratio and at a higher torque than the leg not under load.

A further object of the invention is to provide a trailer supporting structure having the multiple speed characteristic and the leveling characteristic without the use of speed change gearing.

A supporting structure made in accordance with the invention is shown in the accompanying drawings.

Figure 1:
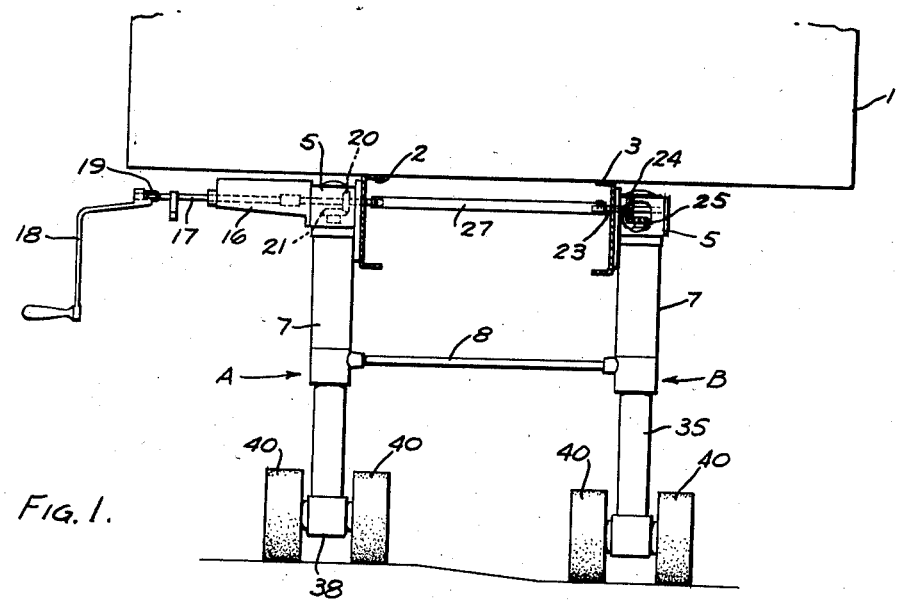
Fig. 1 is a view showing a semi-trailer frame and body with the supporting legs thereon lowered into ground engaging position and illustrating a non-level ground condition.

The body of a vehicle, such as a semi-trailer, is illustrated at 1, and the frame members are illustrated as being of channel construction as indicated at 2 and 3. It will be noted that, as usual, the trailer body overhangs the supporting structure.

The two legs as indicated at A and B are substantially identical and, therefore, a description of one will suffice. Like parts of the two legs have the same reference characters applied thereto.

Each leg has a top housing portion 5, suitably secured to the frame member as indicated at 6 and depending from the housing 5 is a fixed tubular leg section 7. These leg sections may be interconnected by a cross rod 8 for strength purposes and may further be strengthened by angular struts 9.

Journalled in each head portion is a vertically extending shaft 15 and means are provided for turning the same. For this purpose, there is a bracket 16 secured to one of the housings 5 for supporting a driving shaft 17 which may be equipped with a manually operable handle or crank 18 coupled to the shaft 17 as at 19 so that the crank may be folded into a position of nonuse particularly when the vehicle is being operated over a highway. This shaft has a gear 20 thereon for driving a gear 21 in one leg. The opposite leg has a stub shaft 23 with a gear 24 thereon for driving a gear 25. The shaft 17 and the stub shaft 23 are connected by a suitable driving rod or tube 27. It will be seen that upon rotation of the crank that the gears 21 and 25 are rotated and these gears are connected respectively to the shaft 15 in the two legs.

Figure 3:
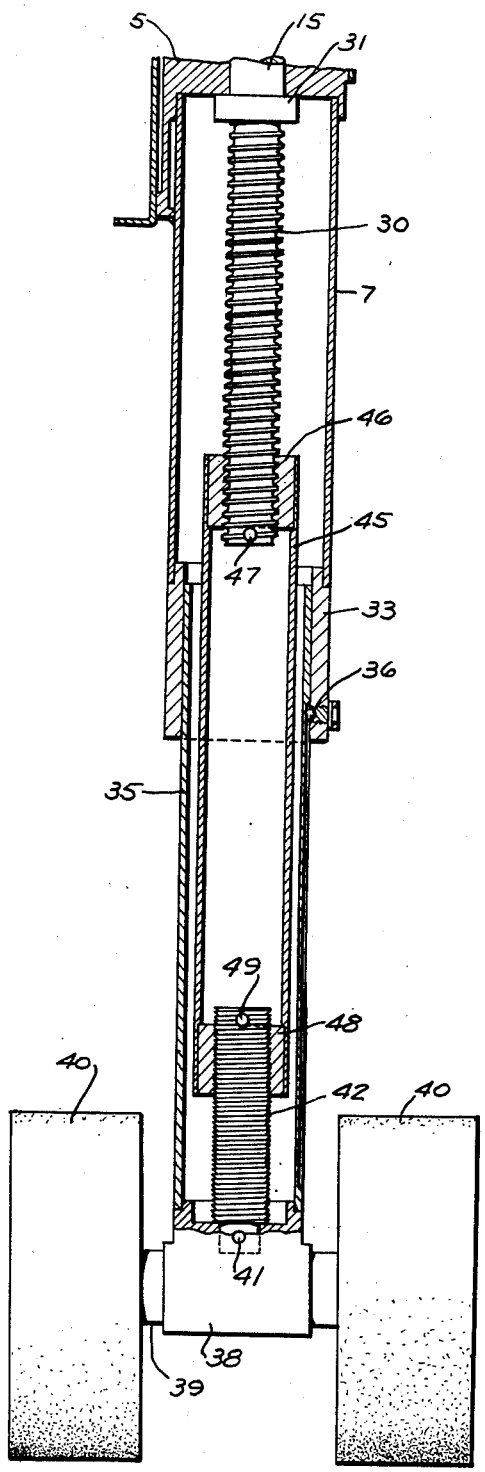
Fig. 3 is an enlarged sectional view taken through a supporting leg showing the same fully extended.
Figure 4:
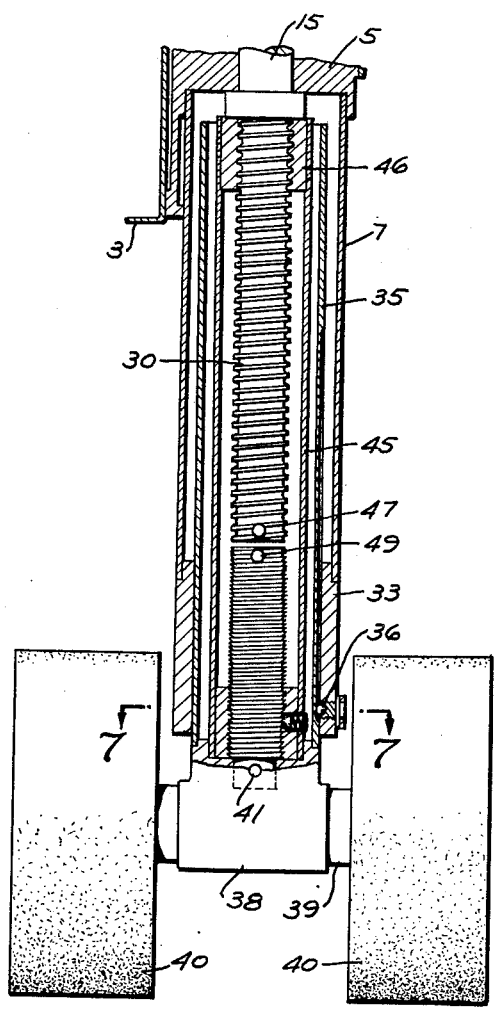
Fig. 4 is a view similar to Fig. 3 showing the support leg in elevated position.

It will be noted by reference particularly to Figs. 3 and 4 that the shaft 15 projects downwardly in the fixed tubular leg section 7 and that this shaft is provided with screw threads 30. The shaft has a thrust bearing 31 for seating against the underside of the housing 5.

At the lower end of the fixed leg section 7 is a guide member 33 which may be a hollow casting welded or otherwise secured to the lower end of the leg section 7, and slidably mounted therein is a projectable leg section 35 of tubular form.

The member 35 is slidable in the guide 33 and is held against rotation therein as by means of a ball key 36.

On the lower end of the projectable leg section 35, and suitably secured thereto, is an axle housing 38 through which axle 39 extends and upon the ends of which are suitable ground engaging elements, such as wheels or rollers 40. Secured to the housing 38 as by means of a pin 41 is a screw member 42 having threads 43. This screw member is non-rotatable relative to the housing 38.

There is an interconnection between the screw member 30 and the screw member 42. This is shown as being in the form of a tubular member 45 fixedly secured to a nut 46 with internal threads engaging the threads 30. A pin 47 in the lower end of the screw 15 limits the movement of the nut 46. At the opposite end of the tube or sleeve 45 is a nut 48 with internal threads engaging with the threads on the member 42. A pin 49 limits the movement of the nut 48 on the screw 42. It is to be emphasized that the nuts 46 and 48 are securely fixed to the sleeve 45 so they cannot rotate relative thereto.

Figure 6:
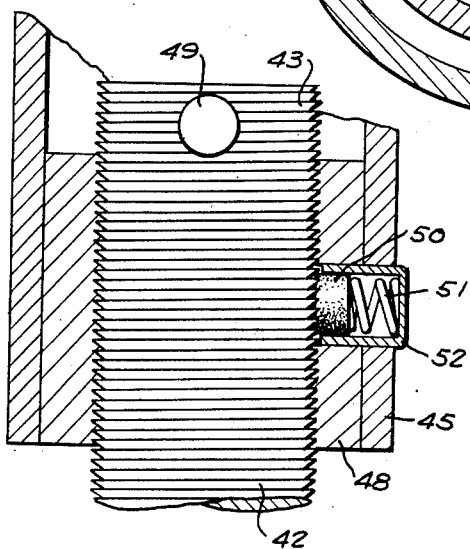
Fig. 6 is a further enlarged view showing another of the screws.

Friction means is incorporated between the nut 48 and the screw 42 to control the relative movement thereof and such a structure is shown in Fig. 6. A suitable washer of fiber or like material 50 is positioned in an aperture in the nut 48 and held frictionally against the member 42 as by means of a coil spring 51. To take the reaction of the spring there is a spring retainer 52 suitably secured in position to the nut 48 or sleeve 45. Suffice it to say, that the spring holds the friction element 50 yieldingly against the screw 42.

Figure 5:
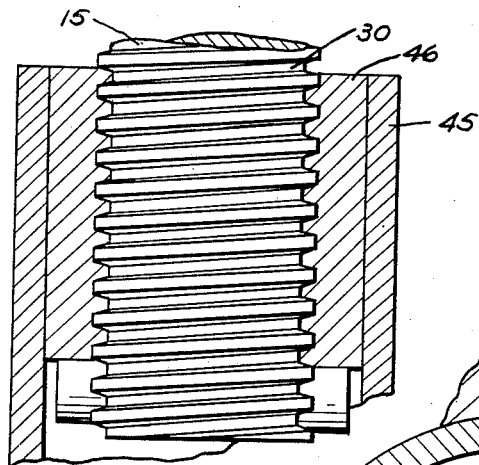
Fig. 5 is a further enlarged view illustrating one of the screw elements.
Figure 7:
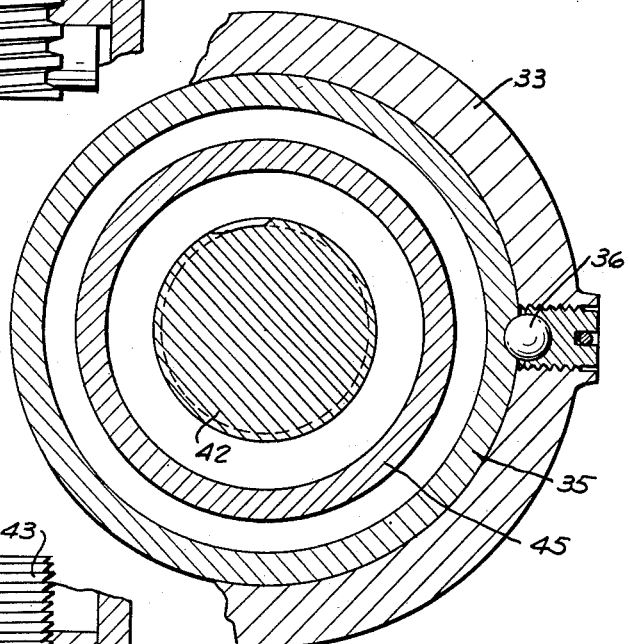
Fig. 7 is an enlarged cross sectional view taken substantially on line 7—7 of Fig. 4.

In accordance with the invention the screw 30 may be of the Acme type, this being a thread with a flat crest, and the screw threads 43 of the screw member 42 may be of the saw tooth type, as illustrated respectively in Figs. 5 and 6. Moreover, the pitch of the threads of the screws are different, the pitch of the thread 30 being materially greater than that of the thread 43. The best way, perhaps, to explain the situation is to give an example, although, of course, the invention is not by any means limited to the precise example. The example selected is that where the screw 15 is provided with a four-pitch thread and the screw 42 provided with a 14 pitch thread, that is, 4 threads and 14 threads to the inch respectively.

Figure 2:
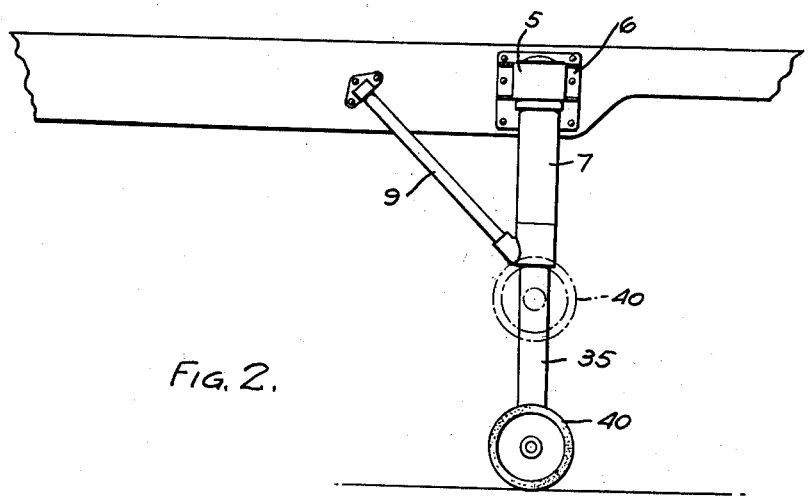
Fig. 2 is a side view showing a support mounted on a frame, illustrating a leg in projected position and showing the retracted position in dotted lines.

The operation of the device will be explained with regards to the above example. The two legs may be adjusted so that the adjustable portions 35 are in elevated position as shown by the dotted line of the ground engaging wheel in Fig. 2, and in this position the tubular elements, when substantially completely retracted, are in a position shown in Fig. 4. At this time the handle 18 may be folded and placed into a retainer, not shown, to thus hold the operating shaft 17 against rotation. To lower the legs the handle is disposed as shown in Fig. 1, and the shaft 17 turned, thus simultaneously and uniformly turning the two shafts 15. With the ground engaging wheels suspended there is no load on the legs to be supported and, therefore, the screw threads 30 turn easily in their nuts 46. At this time, the friction element 50 furnishes sufficient resistance to the turning of the tube 45 that the tube and the nut 46, as well of course, as the nut 48, do not rotate. Therefore, the projectable leg sections are projected downwardly and relatively rapidly by the action of the screw threads 30.

Let it be supposed that the ground or roadway is uneven as shown in Fig. 1. The ground engaging elements 40 of the leg A, see Fig. 1, is viewed, will strike the ground first while the ground engaging element of the other leg B remains suspended in the air. Immediately some of the load of the vehicle comes to bear upon the leg A. This thrust load is transmitted through the screw 42, nut 48, tube 45, nut 46, screw 15 to the thrust bearing 31. This load sets up a resistance to further movement of the nut 46 on its threads 30 and the resistance is sufficient, when there is any substantial thrust load, to overcome the friction exerted by the friction element 50. Therefore, the tubular element 45 will begin to turn with the screw 15 and the nut 48 will begin to turn upon the threads 43 of the screw 42. Let us suppose that there is a ground differential of 3". Continued turning of the crank 18 causes the screw members 15 to turn at the same speed and in 12 revolutions of the shaft 15 the ground engaging elements of the leg B as Fig. 1 is viewed, will be lowered to the ground, a distance of 3". During this time, the ground engaging elements of the left hand leg, as Fig. 1 is viewed, travels on 6/7 of an inch. So, it will be seen that there is a substantially automatic levelling characteristic.

If the trailer frame is to be elevated, the handle is further operated in a direction to further project the two supporting legs, and when the trailer load is on both legs, both will be projected by the function of the low pitch thread, and thus will be projected uniformly.

It will be observed, therefore, that in addition to the self-leveling characteristics that there is a fast action in adjusting the legs to lowered position while not under load. This represents a high speed ratio and a low torque ratio. As soon as the support is under load, however, the situation automatically changes so that there is a higher torque ratio to the benefit of the operator, accomplished, of course, by the lower speed ratio. Thus due to the low pitch thread, a person may cause the substantial load of the trailer to be elevated.

The semi-trailer, of course, may be left standing with the support taking its load while goods or merchandise are being loaded or unloaded, or for that matter, the trailer may be left standing for any other purpose. When the trailer is to be employed again with a tractor the supporting legs are to be elevated. This is done by turning the manual crank in the opposite direction. So long as the struts are under load, there is a relative turning between the nut 48 and the screw 42 of each leg; when the load is released the relative turning occurs between the higher pitch screw 42 and the nut 46. In elevating the two legs of the support, they will readjust or recycle themselves back to their original position. For example, take the situation as shown in Fig. 1; as the legs are elevated the leg B will be freed of load first and it will then be operated by the high pitch screw, whereas the leg A will be operated by the low pitch screw until the load is relieved in the same manner but just the reverse of the action when the legs were projected. When the support is fully retracted, the nut 46 of each leg may come into abutment with the thrust member 31 thus preventing further relative rotation between the nut 46 and screw 30, at which time the nut 48 will turn on the low pitch screw 42 until it reaches the limit of its movement. Thus under any circumstances the legs may be set back to the condition shown in Fig. 4 any time they are fully retracted.

I claim:

1. A supporting structure for a trailer vehicle comprising, a leg section fixed to the trailer vehicle, a projectable and retractable leg section having ground engaging means, a first screw member rotatably mounted on the trailer, a second screw member non-rotatably mounted on the projectable and retractable leg section, projectable means interconnecting the screw members including a nut threaded on each screw member, operating means for turning the first screw member for the projection and retraction of the projectable and retractable leg section, the screws and nuts being arranged to take the thrust load of the trailer vehicle when supporting the same, and friction means acting between one screw member and its nut for controlling the relative rotation between the two screws and their respective nuts as the first screw member is turned by the operating means.

2. A supporting structure for a trailer vehicle comprising, a first leg section fixed to the trailer vehicle, a second leg section which is projectable and retractable relative to the first leg section and which has ground engaging means, a first screw member rotatably mounted in a fixed position relative to the first leg section, a second screw member non-rotatably mounted on the second leg section, means interconnecting the screw members including a nut threaded on each screw member, operating means for turning the first screw member to project and retract the second leg section, the screw members and nuts being arranged to take the load of the trailer vehicle when supporting the same, and friction means acting between the second screw member and its nut for controlling the relative rotation between the two screw members and their respective nuts as the first screw member is turned by the operating means.

3. A supporting structure for a trailer vehicle comprising, a first leg section fixed to the trailer vehicle, a second leg section which is projectable and retractable relative to the first leg section and which has ground engaging means, a first screw member journaled within the first leg section, a second screw member secured to the second leg section, one of said screw members having a relatively high pitch thread and the other having a relatively low pitch thread, means interconnecting the screw members including a nut threaded on each screw member, operating means for turning the first screw member for the projection and retraction of the second leg section, the screw members and nuts being arranged to take the load of the trailer vehicle when supporting the same, and friction means acting between one of the screw members and its nut for controlling the relative rotation between the two screw members and their respective nuts.

4. A supporting structure for a trailer vehicle comprising, first and second leg sections, one of which is projectable and retractable relative to the other, a screw member rotatable relative to and axially fixed relative to the first leg section, a screw member non-rotatably mounted on the second leg section, means interconnecting the screw members including a nut threaded on each screw member, friction means interposed between one screw member and its nut, and means for rotating the other screw member.

5. A supporting structure for a trailer vehicle comprising, a projectable and retractable supporting leg member, a first screw member having a position axially fixed relative to the trailer vehicle, a second screw member mounted on said supporting leg and being non-rotatable, projectable means interconnecting the two screw members including a nut threaded on each screw member, means for rotating the first named screw member, and friction means acting between the second screw member and the interconnecting means for holding the interconnecting means against rotation as the first screw is rotated while the supporting structure is not under load, said friction means being overcome when the supporting structure is under load, whereby the interconnecting means rotates in substantial unison with the turning of the first screw member.

6. A supporting structure for a trailer vehicle comprising, a projectable and retractable supporting leg member, a first screw member having a position axially fixed relative to the trailer vehicle, said screw member having a relatively high pitch thread, a second screw member mounted on said supporting leg and being non-rotatable, said second screw member having a relatively low pitch thread, projectable means interconnecting the two screw members including a nut threaded on each screw member, means for rotating the first named screw member, and friction means acting between the second screw member and the interconnecting means for holding the interconnecting means against rotation as the first screw is rotated while the supporting structure is not under load, said friction means being overcome when the supporting structure is under load, whereby the interconnecting means rotates in substantial unison with the turning of the first screw member.

7. Means for projecting and retracting a supporting leg for a trailer vehicle comprising, two screw members, projectable means interconnecting the screw members including a threaded nut mounted on each screw member, operating means for rotating one screw member, friction means being interposed between the other screw member and said interconnecting means, said friction means holding the interconnecting means and the said other screw member against rotation relative to each other, whereby upon turning of the first screw member, when the support is not under load, it turns relative to its nut and the interconnecting means, and whereby when the support is under load, the friction of said means is overcome and the interconnecting means turns with the first named screw member and relative to the second named screw.

8. The supporting structure as described in claim 7 characterized in that the first screw member has a relatively high pitch thereon and the second screw member has a relatively low pitch thereon.

9. A supporting structure for a trailer vehicle comprising, a fixed tubular leg member, an adjustable tubular leg member slidably and non-rotatably mounted with the fixed leg member, ground engaging means on the adjustable tubular member, a first screw member having a relatively high pitch thread mounted within and axially fixed relative to the fixed leg member, a second screw member having a relatively low pitch thread non-rotatably mounted on the adjustable leg member, a nut on each thread member, a tubular inter-connecting element connected to the two nuts, means for rotating the first screw member, and friction means interposed between the second screw member and the interconnecting element for exerting frictional load to hold the inter-connecting element and the nuts against rotation when the first screw member is rotated and the support is not under load, and being arranged to be overcome when the support is under load for the turning of the inter-connecting element relative to the second screw member.

10. A supporting structure for a trailer vehicle comprising, a supporting leg adjacent each side of the vehicle, each leg having a projectable and retractable section, a first axially fixed screw member for each leg having a relatively high pitch thread thereon, a second screw member for each leg non-rotatably connected to the projectable and retractable section and each having a relatively low pitch thread thereon, a connecting element for the two screw members of each leg including a nut on the threads of each screw member, operating means for turning the first screw members of the two legs in unison, friction means between the second screw member of each leg and the connecting element thereof arranged to hold the connecting element against rotation relative to the second screw member in each leg when the legs are not under load, whereby the projectable section of each leg is projected and retracted by the relative turning of the first screw in each leg and the nut thereon, the friction means of a leg being overcome when the leg is under load, whereby the adjustable leg section is shifted by the relative turning of the nut on the second screw member, so that as the adjustable leg sections are being projected, they automatically adjust themselves to irregularities in the ground or roadway.

References Cited in the file of this patent
UNITED STATES PATENTS

| Number | Name | Date |
|---|---|---|
| 1,192,611 | Field | July 25, 1916 |
| 1,275,971 | Michelin | Aug. 13, 1918 |
| 1,878,219 | Ward | Sept. 20, 1932 |
| 1,970,619 | Pachowicz | Aug. 21, 1934 |
| 1,989,251 | Snell et al. | Jan. 29, 1935 |
| 2,446,517 | Black | Aug. 10, 1948 |
| 2,550,801 | Geerds | May 1, 1951 |